United States Patent [19]
Schad et al.

[11] Patent Number: 5,240,757
[45] Date of Patent: Aug. 31, 1993

[54] MOLDED ARTICLE

[75] Inventors: Robert D. Schad; Stefan Von Buren, both of Toronto, Canada

[73] Assignee: Husky Injection Molding Systems Ltd., Bolton, Canada

[21] Appl. No.: 865,483

[22] Filed: Apr. 9, 1992

[51] Int. Cl.$^5$ ............................ B32B 3/00; B29B 7/00
[52] U.S. Cl. ...................................... 428/172; 428/58;
428/161; 428/163; 428/167; 428/192; 264/241;
264/271.1; 264/328.1; 264/328.8
[58] Field of Search .............. 428/33, 53, 58, 76,
428/83, 113, 156, 172, 167, 176, 122, 161, 163,
157; 427/188, 192, 373; 358/901; 156/166;
264/241, 171, 248, 250, 513, 524, 252, 271.1,
297.1, 328.1, 328.8

[56] References Cited
U.S. PATENT DOCUMENTS

| | | | |
|---|---|---|---|
| 3,003,189 | 10/1961 | Slayton et al. | 18/30 |
| 3,476,852 | 11/1969 | Shattuck | 264/261 |
| 4,115,506 | 9/1978 | Shima | 264/250 |
| 4,314,960 | 2/1982 | Hass | 264/276 |
| 4,410,480 | 10/1983 | Shafer, Jr. | 264/262 |
| 4,448,741 | 5/1984 | Schad | 264/251 |
| 4,470,784 | 9/1984 | Piotrovsky | 425/116 |
| 4,599,062 | 7/1986 | Konishi | 425/116 |
| 4,959,000 | 9/1990 | Giza | 425/116 |

Primary Examiner—Donald J. Loney
Attorney, Agent, or Firm—Bachman & LaPointe

[57] ABSTRACT

Molded article including an internal member therein, wherein the molded article includes a first and second molded part, wherein the member is encapsulated within the molded article. The first molded part preferably includes a contoured groove with the member seated in the groove.

13 Claims, 3 Drawing Sheets

MOLDED ARTICLE

BACKGROUND OF THE INVENTION

The present invention relates to a molded article including an internal member wherein the internal member is encapsulated within the molded article, as for example, a fiber optic cable encapsulated within a plastic article.

Insert molding is well known and is typically used for producing articles having components encapsulated within the plastic article. The inserts are typically rigid components made from metals or plastic and are sufficiently rigid enough themselves to withstand the forces and temperature of the incoming injected plastic during their encapsulation.

U.S. Pat. No. 3,476,852 shows a composite plastic container molded by first inserting into the mold cavity preformed plastic inserts, which are then surrounded by an injection of similar plastic to bond to the inserts by melting the edges of the inserts and forming a welded bond. The preformed inserts are relatively large compared to the injected plastic volume and are well supported within the closed mold cavity. A second example of injected resin welding to plastic inserts is shown in U.S. Pat. No. 4,410,480. Here two components are welded into a composite body by the injection of the resin. Again they are large compared to the volume of injected resin and well located and supported within the closed mold cavity.

U.S. Pat. Nos. 4,314,960 and 4,599,062 show molds into which are loaded metal electrical cables or connectors for encapsulation by plastic which is injected into the mold. Here the inserts are sufficiently rigid and made of a material resistant to the thermal and pressure shock of the injected plastic, to remain well located. U.S. Pat. No. 3,003,189 shows a wire feeding mechanism for insert molding articles containing embedded wire. In this machine, the metal is held in a straight orientation and plastic is molded around it. Accurate positioning of the wire is not an issue. Similarly the wire is not adversely affected by the heat of the injected plastic.

U.S. Pat. Nos. 4,470,784 and 4,959,000 show insert molding methods whereby the insert is positioned within the mold cavity by retractable means so that it can be completely surrounded by the injected plastic. The '784 patent uses retractable pins that withdraw into the insert itself and the '000 patent uses retractable pins that withdraw into the mold cavity wall. In both cases the injected plastic does not adversely affect the insert by virtue of injection pressure or temperature.

U.S. Pat. No. 4,448,741 shows a slender insert being partially encapsulated in resin by a two stage molding process including the step of molding spacers onto the insert in the first molding stage, followed by a second molding step. Thus, the insert is exposed to two injection molding operations and is therefore more likely to become damaged from this additional handling and processing.

It is a principal object of the present invention to provide a molded article including an internal member encapsulated therein.

A further object of the present invention is to provide an article as aforesaid which is easy to prepare and which can be prepared by injection molding techniques without damage to the internal member and which exposes the internal member to only a single injection molding operation.

A further objective of the present invention is to provide an article as aforesaid wherein the internal member may be a fiber optic cable which is accurately located within the article.

Further objects and advantages of the present invention will appear hereinbelow.

SUMMARY OF THE INVENTION

In accordance with the present invention the foregoing objects and advantages may be readily obtained. The molded article of the present invention includes an internal member encapsulated therein and comprises: a first part having a first external surface and a second external surface spaced from the first external surface; a member having an external member surface seated against the first part between the first and second external surfaces; and a second part molded against the first part and encapsulating the member within the molded article. A contoured groove is preferably provided in the first part between the first and second external surfaces defined by groove walls, wherein the external member surface is seated in the groove. The groove walls preferably surround the major portion of the external member surface and the second part surrounds the member surface not surrounded by the groove walls. Preferably the first and second parts are bonded together and preferably both the first and second parts are injection molded. In a preferred embodiment, the member is a fiber optic cable encapsulated within a plastic article. It is preferred that the internal member or cable be substantially centered in the plastic article.

The internal member, such as a cable, may include portions which protrude from the plastic article and in a preferred embodiment the fiber optic cable is polymethylmethacrylate fiber coated with a fluorocarbon polymer skin. It is preferred that the first and second parts be formed from the same resin. Generally, the contoured groove substantially corresponds to the internal member shape in the area where the groove surrounds the same.

Further objects, advantages and features of the present invention will appear hereinbelow.

DETAILED DESCRIPTION

It is a principal objective of the present invention to accurately locate a member such as a fiber optic cable in a plastic article wherein the fiber optic cable is encapsulated within the article in a desired location and wherein the fiber optic cable is protected as much as possible from adverse temperature and pressure effects from the injected plastic material which forms the molded article. The present invention will be described hereinbelow with reference to a fiber optic cable; however, it should be understood that the present invention is intended to cover the encapsulation of any internal member, such a metal member, an internal magnet, and so forth.

Figure 1:
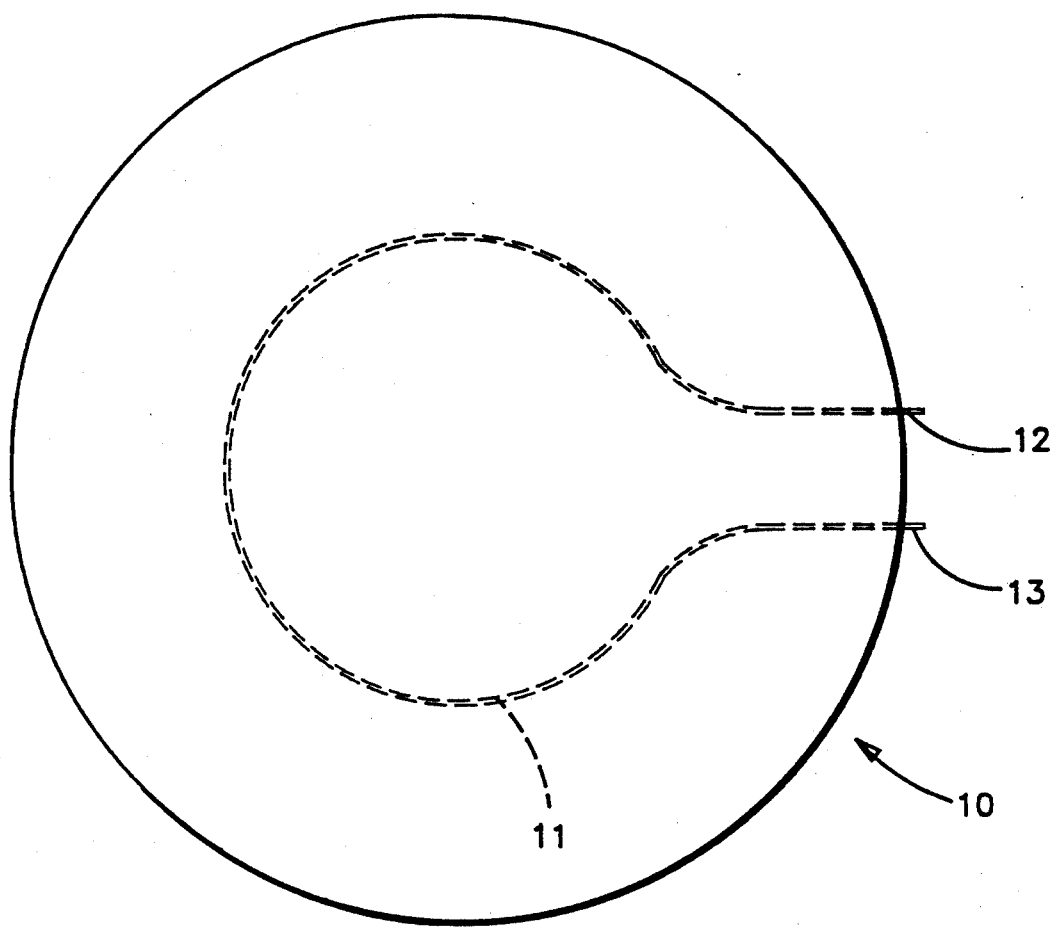
FIG. 1 is a plan view of a representative molded article of the present invention with internal member shown in phantom.
Figure 2:
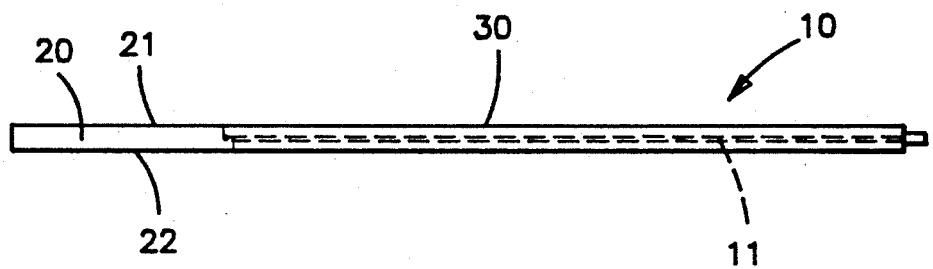
FIG. 2 is a side view of the article of FIG. 1.

FIG. 1 shows a representative molded article 10 in which is encapsulated, a fiber optic cable 11, shown in phantom with ends 12 and 13 protruding from the transparent disk. In accordance with the preferred embodiment, the molded article is a transparent disk as shown in FIG. 1; however, the present invention is not limited to the molded article as a disk or the molded article as a transparent material. Naturally, the shape and character of the molded article will widely vary depending on desired product and any convenient article may be obtained. As can be seen in FIG. 1, fiber optic cable 11 is substantially centered in disk 10. FIG. 2 represents a side view of the article of FIG. 1 wherein fiber optic cable 11 is clearly shown as being centered within the thickness of disk 10.

Molded article 10 as shown in FIG. 2 comprises a first part 20 having a first external surface 21 and a second external surface 22 spaced from the first external surface.

Figure 3:
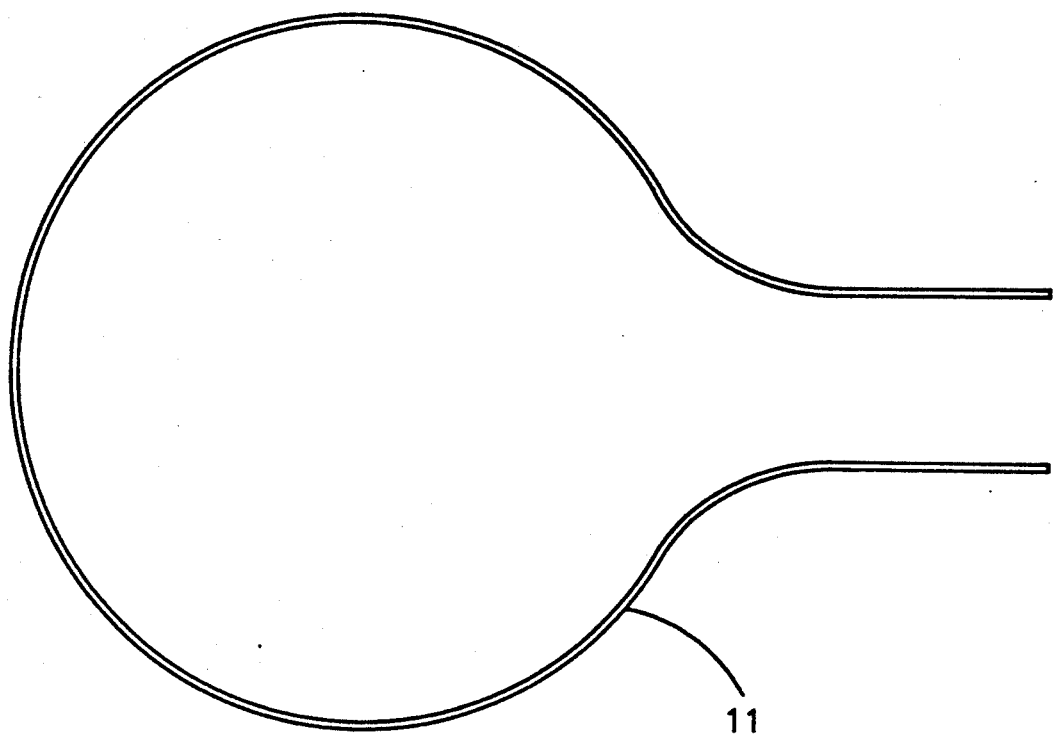
FIG. 3 is a plan view of a fiber optic cable for insertion into the molded article of FIG. 1.

FIG. 3 shows a plan view of the fiber optic cable 11 for encapsulation in molded article 10.

Figure 4:
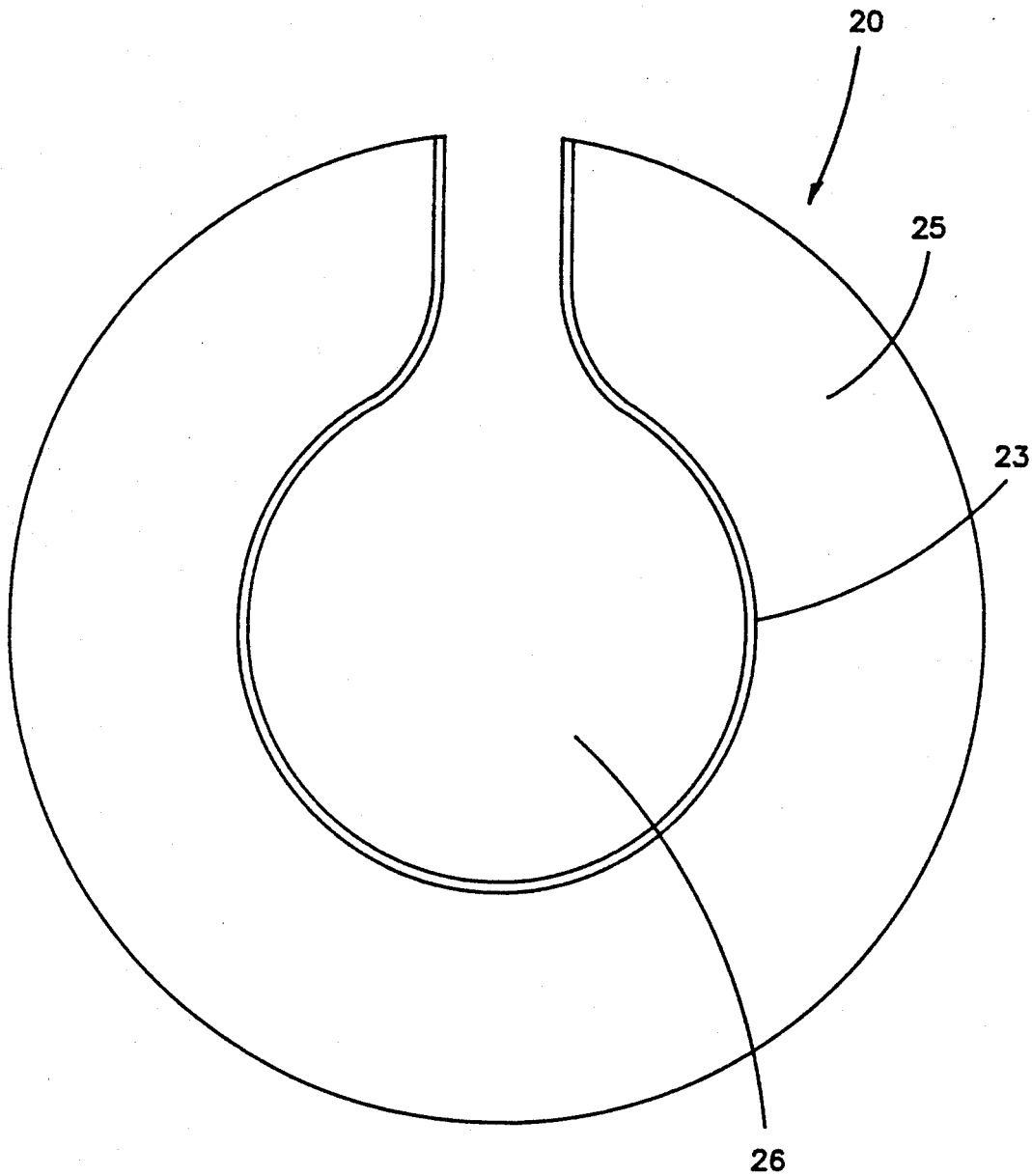
FIG. 4 is a plan view of a first part forming the molded article of FIG. 1.

FIG. 4 represents a plan view of first part 20 which includes a contoured groove 23 therein. The features of the contoured groove are clearly shown in the sectional view of FIG. 5 wherein groove 23 is defined by groove walls 24 and wherein groove 23 is located between the first external surface 21 of part 20 and the second external surface 22 of part 20. First part 20 includes a peripheral circumferential portion 25 and an internal open portion 26 adjacent contoured groove 23.

Figure 5:
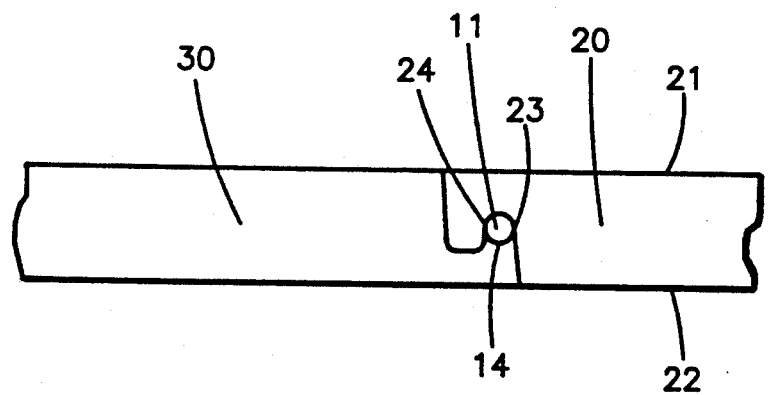
FIG. 5 is a partial sectional view of the molded article of FIG. 1 showing the interface between the first and second parts with a fiber optic cable encapsulated therein.

Second part 30 is molded against first part 20 as clearly shown in FIGS. 2 and 5. The fiber optic cable 11 includes an external surface 14 seated in groove 23 wherein groove walls 24 surround the major portion of the external surface 14 of the fiber optic cable, also as clearly shown in FIG. 5. Naturally, the internal member may be any desired object and may not necessarily be a fiber optic cable, although this is preferred.

Preferably, the first and second parts 20 and 30 are injection molded so that the second part 30 is molded against first part 20 with fiber optic cable 11 seated in groove 23 and so that the second part 30 surrounds the external fiber optic cable surface 14 not surrounded by the groove walls. Thus, as clearly shown in FIG. 5, the fiber optic cable is seated internally of the molded article at the junction of the first and second parts.

The first part 20 may be conventionally injection molded in a first mold with contoured groove 23 molded therein wherein the contoured groove matches in section part of the cross section of the desired internal member which is to be encapsulated within the final molded article. Thus, the first part 20 serves as a locating means and holder for the internal member, which may take any desired shape, as the shape of a fiber optic cable. Because the groove 23 configuration closely matches the shape of the cable and because the depth of the groove extends substantially past the center of the cable, most of the cable section is enclosed by the groove contour and therefore is protected by the groove. In the second molding step, the first molded part with cable installed therein is preferably loaded as an insert into a second mold and plastic resin preferably the same as used for molding the first molded part is injected into the second mold to fill center section 26 of the first part and completely encapsulate cable 11 within the molded article as clearly shown in FIG. 5.

The fiber optic cable may be any conventional fiber optic cable, for example typically a polymethylmethacrylate fiber coated with a fluorocarbon polymer skin. Because the cable is substantially enclosed in groove 23 during injection of plastic in the second molding step, the cable or any desired internal member is protected from the thermal and pressure shock of the injected resin. Hence, in accordance with the present invention, the location of the cable within the molded article remains consistent and can be repeatedly accurately positioned without adverse affects on the surface of the cable.

It is preferred that both molded parts of the molded article are made from the same resin, with the second part being injected against the first part containing the internal member positioned in the groove in a second stage molding step, whereby the first and second parts are welded together as local melting occurs. Although a slight witness line will be evident between the two molded parts, this will not substantially reduce the characteristics of the final article or the photometric performance of the disk or cable. Conventional molds may be employed in the preparation of the molded article of the present invention. Assembly and loading of the parts may readily be performed manually or automatically as desired.

Any desired plastic can be used for the molded article depending on the particular application, such as polystyrene, polycarbonate, styrene acrylonitrile, methyl methacrylate, etc.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A molded article having first and second parts and including an internal member which comprises: a first part having a first external surface and a second external surface spaced from the first external surface and an edge region; an internal member having an external member surface and being seated internally of the molded article against the first part between the first and second external surfaces; a contoured groove in the edge region of the first part between the first and second external surfaces defined by groove walls, wherein the external member surface is seated in the groove and wherein the groove walls surround a major portion of the external member surface; a second part having an edge region molded against the first part wherein the first and second parts encapsulate the internal member within the molded article; and wherein the second part surrounds the external member surface not surrounded by the groove walls, and wherein the edge regions of the first and second parts are in abuttment and overlap.

2. An article according to claim 1 wherein the first and second parts are bonded together.

3. An article according to claim 1 wherein the first and second parts are injection molded.

4. An article according to claim 1 wherein the member is a fiber optic cable encapsulated within a plastic article.

5. An article according to claim 4 wherein the cable is substantially centered in the plastic article.

6. An article according to claim 4 wherein the cable includes portions which protrude from the plastic article.

7. An article according to claim 4 wherein the fiber optic cable is polymethylmethacrylate fiber coated with a fluorocarbon polymer skin.

8. An article according to claim 3 wherein the first and second parts are of the same plastic material.

9. An article according to claim 4 wherein the groove substantially corresponds to the cable shape in the area where the groove surrounds the cable.

10. An article according to claim 1 including a junction between the first and second parts, wherein the number is located at said junction.

11. An article according to claim 1 in the shape of a disc.

12. An article according to claim 1 wherein the first part forms the periphery of the molded article and the second part forms the center of the molded article.

13. An article according to claim 1 wherein the first and second external surfaces of the first part form major external surfaces of the first part.

* * * * *